United States Patent
Okada et al.

(10) Patent No.: US 10,717,297 B2
(45) Date of Patent: Jul. 21, 2020

(54) INKJET RECORDING METHOD AND INKJET RECORDING APPARATUS

(71) Applicant: RICOH COMPANY, LTD., Tokyo (JP)

(72) Inventors: Takashi Okada, Kanagawa (JP);
Tomohiro Inoue, Kanagawa (JP);
Hisashi Habashi, Kanagawa (JP);
Masayuki Koyano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/163,787

(22) Filed: Oct. 18, 2018

(65) Prior Publication Data

US 2019/0048216 A1 Feb. 14, 2019

Related U.S. Application Data

(63) Continuation of application No. 15/232,118, filed on Aug. 9, 2016, now abandoned, which is a (Continued)

(30) Foreign Application Priority Data

Dec. 26, 2013 (JP) ................................ 2013-268914

(51) Int. Cl.
*B41J 2/21* (2006.01)
*C09D 11/322* (2014.01)
(Continued)

(52) U.S. Cl.
CPC ......... *B41J 2/2114* (2013.01); *B41J 2/17503* (2013.01); *B41M 5/50* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598;
(Continued)

(56) References Cited

U.S. PATENT DOCUMENTS 8,435,339 B2 5/2013 Koyano et al.
2003/0131761 A1 7/2003 Hayashi et al.
(Continued)

FOREIGN PATENT DOCUMENTS

JP 2852487 11/1998
JP 2007-231130 9/2007
(Continued)

OTHER PUBLICATIONS

Japanese Official Action dated Jul. 25, 2017 in connection with corresponding Japanese patent application No. 2013-268914.
(Continued)

*Primary Examiner* — Manish S Shah
(74) *Attorney, Agent, or Firm* — Oblon, McClelland, Maier & Neustadt, L.L.P.

(57) ABSTRACT

Provided is an ink containing at least: an inorganic pigment having a surface hydrophobicity; resin particles; and water.

13 Claims, 5 Drawing Sheets

Related U.S. Application Data continuation of application No. 14/571,506, filed on Dec. 16, 2014, now abandoned.

(51) Int. Cl.

| | | |
|---|---|---|
| *B41J 2/175* | (2006.01) | |
| *B41M 5/50* | (2006.01) | |
| *C09D 11/107* | (2014.01) | |
| *C09D 11/102* | (2014.01) | |
| *C09C 1/36* | (2006.01) | |
| *C09C 1/30* | (2006.01) | |
| *C09D 11/36* | (2014.01) | |
| *C08K 9/04* | (2006.01) | |
| *C08K 9/02* | (2006.01) | |
| *C08K 9/06* | (2006.01) | |

(52) U.S. Cl.
CPC .............. *C09C 1/30* (2013.01); *C09C 1/3653* (2013.01); *C09C 1/3669* (2013.01); *C09C 1/3684* (2013.01); *C09D 11/102* (2013.01); *C09D 11/107* (2013.01); *C09D 11/322* (2013.01); *C09D 11/36* (2013.01); *C01P 2004/62* (2013.01); *C01P 2006/22* (2013.01); *C08K 9/02* (2013.01); *C08K 9/04* (2013.01); *C08K 9/06* (2013.01); *Y10T 428/24901* (2015.01)

(58) Field of Classification Search
CPC .................................................. B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52

See application file for complete search history.

(56) References Cited

U.S. PATENT DOCUMENTS

| | | | |
|---|---|---|---|
| 2004/0189772 A1* | 9/2004 | Arai | B41J 2/2117 347/102 |
| 2005/0117008 A1 | 6/2005 | Konishi | |
| 2005/0243121 A1* | 11/2005 | Onishi | B41J 2/2114 347/21 |
| 2009/0000508 A1 | 1/2009 | Edison et al. | |
| 2009/0053451 A1 | 2/2009 | Smith | |
| 2009/0142677 A1* | 6/2009 | Shitara | G03G 15/2025 430/48 |
| 2009/0146277 A1 | 6/2009 | Shitara et al. | |
| 2010/0091064 A1* | 4/2010 | Araki | B41J 2/0057 347/21 |
| 2010/0105807 A1 | 4/2010 | Sugita et al. | |
| 2011/0184108 A1 | 7/2011 | Okuda et al. | |
| 2012/0026237 A1* | 2/2012 | Hakiri | C09D 11/324 347/20 |
| 2012/0287211 A1* | 11/2012 | Sano | B41J 3/407 347/100 |
| 2013/0222497 A1* | 8/2013 | Nakano | B41J 2/2117 347/100 |
| 2013/0253106 A1 | 9/2013 | Saito et al. | |
| 2014/0055520 A1 | 2/2014 | Inumaru et al. | |

FOREIGN PATENT DOCUMENTS

| | | |
|---|---|---|
| JP | 2009-167377 | 7/2009 |
| JP | 2010-222385 | 10/2010 |
| JP | 2011-151329 | 8/2011 |
| JP | 2011-225867 | 11/2011 |
| JP | 2012-179756 | 9/2012 |
| JP | 2012-188467 | 10/2012 |
| JP | 2013-82885 | 5/2013 |
| JP | 2013-194222 | 9/2013 |
| JP | 2013-208760 | 10/2013 |
| JP | 2014-043492 | 3/2014 |
| WO | 2012/090477 A1 | 7/2012 |

OTHER PUBLICATIONS

Japanese official action dated Sep. 12, 2017 in connection with Japanese patent application No. 2013-268914.

Aug. 14, 2018 Japanese official action in connection with corresponding Japanese patent application.

* cited by examiner

INKJET RECORDING METHOD AND INKJET RECORDING APPARATUS

CROSS-REFERENCE TO RELATED APPLICATIONS

This application is a Rule 1.53(b) continuation of application Ser. No. 15/232,118 filed Aug. 9, 2016 which in turn is a Rule 1.53(b) continuation of application Ser. No. 14/571,506 filed Dec. 16, 2014 which is based on, and claims priority under 35 U.S.C. § 119 to, Japanese Patent Application No. 2013-268914 filed with the Japanese Patent Office on Dec. 26, 2013.

BACKGROUND OF THE INVENTION

Field of the Invention

The present invention relates to an ink, an ink cartridge, and an inkjet recording apparatus.

Description of the Related Art

Most ordinary inkjet recording inks are highly transparent inks intended for being printed on white recording media. When such inks are printed on a transparent base material or a base material having a low luminosity, a visible print is difficult to obtain because a contrast or a clear color development performance may not be obtained. Hence, attempts are being made to use white inks having a high hiding power.

As such white inks, inks containing a white inorganic pigment as a colorant are used. Because such inorganic pigments generally have a specific gravity greater than that of organic pigments, their problem is susceptibility to colorant settling. For example, ink cartridges housing an ink containing a commercially available inorganic pigment as a colorant (containing titanium dioxide surface-treated for hydrophilization) have a warning that the ink cartridges must be shaken before use, when 10 days or more has passed since the last service (see http://dl.epson.jp/support/manual/data/ink/pxw8000/4118542_00.PDF).

Further, it has been necessary to use inkjet recording apparatuses including a stirring mechanism or a circulation mechanism, when using inks containing an inorganic pigment such as titanium dioxide as a colorant (see Japanese Patent Application Laid-Open (JP-A) No. 2010-222385).

Further, JP-A No. 2013-208760 describes use of hydrophobized titanium dioxide as an aqueous dispersion. However, titanium dioxide is not used as a colorant; titanium dioxide particles suppress agglutination with an electrolytic effect.

Further, there is proposed an aqueous pigment dispersion liquid that contains: titanium oxide surface-treated with alumina and silica and then further surface-treated with a silane coupling agent; a resin having an anionic group; a water-soluble organic solvent; and a basic compound (see JP-A-No. 2011-225867). However, the resin having an anionic group in this proposal is a water-soluble polymer (a water-soluble styrene acrylic-based resin is used in an Example), and not present in the ink in the form of resin particles, leading to a problem that a settling property and re-dispersibility are poor.

Hence, it is requested to provide an ink in which an inorganic pigment contained as a colorant hardly settles, and can easily redisperse even if it settles.

SUMMARY OF THE INVENTION

An object of the present invention is to provide an ink in which an inorganic pigment contained as a colorant hardly settles, and can easily redisperse even if it settles.

An ink of the present invention as a solution to the problem described above contains at least:
an inorganic pigment having a surface hydrophobicity;
resin particles; and
water.

The present invention can solve the conventional problems described above, achieve the object described above, and provide an ink in which an inorganic pigment contained as a colorant hardly settles, and can easily redisperse even if it settles.

DETAILED DESCRIPTION OF THE INVENTION (Ink)

An ink of the present invention contains at least an inorganic pigment having a surface hydrophobicity, resin particles, and water, preferably contains a water-soluble organic solvent, and further contains other components according to necessity.

According to the present invention, in an ink containing water, a water-soluble organic solvent, a dispersant, and an inorganic pigment, hydrophobization of the inorganic pigment and addition of resin particles make it harder for the inorganic pigment having the surface hydrophobicity to settle and to easily redisperse even if it settles.

<Inorganic Pigment Having Surface Hydrophobicity>

"Surface hydrophobicity" of the inorganic pigment having a surface hydrophobicity is defined as follows. Pure water (10 g) and the inorganic pigment (2 g) are added in a 30 mL sample bottle (SV-30 manufactured by Nichidenrika-Glass Co., Ltd.) in which a stirring bar is put, stirred and mixed at 400 rpm for 10 minutes with a stirrer (MS-2T manufactured by Ishii Laboratory Works Co., Ltd.), and then kept stationary for 30 minutes. In this case, when the inorganic pigment is wholly floating without having settled, it is judged to have a "surface hydrophobicity". When the inorganic pigment has settled even partially, it is judged to have no "surface hydrophobicity".

Examples of inorganic pigments as the inorganic pigment having a surface hydrophobicity include titanium dioxide, silicon dioxide, zinc dioxide, and barium sulfate. One of these may be used alone, or two or more of these may be used in combination. Among these, titanium dioxide is preferable.

The inorganic pigment is not particularly limited, and may be an inorganic pigment that is not surface-treated, or may be an inorganic pigment that is surface-treated in order for wettability with a treating agent for hydrophobization to be increased and thereby hydrophobization efficiency to be improved. Examples of surface treatment include oxides of aluminum silicon, zirconium, and zinc.

Examples of chemical structures for imparting hydrophobicity to the surface of the inorganic pigment include alkyl, alkyl silane, fluoroalkyl, and silicone oil. Among these, silicone treatment and alkyl treatment are preferable.

The inorganic pigment having a surface hydrophobicity may be an appropriately produced product or may be a commercially available product.

As a method for the production, the inorganic pigment having a surface hydrophobicity may be produced by bringing a publicly-known silane coupling agent such as dialkyl dihalogenated silane, trialkyl halogenated silane, and alkyl trihalogenated silane or a silicone oil such as dimethyl silicone oil, and an inorganic pigment into a contact reaction at a high temperature.

Examples of the commercially available product include $TiO_2$ surface-treated with hydrophobic silicone (CR-63 manufactured by Ishihara Sangyo Kaisha, Ltd.), and $TiO_2$ surface-treated with hydrophobic silicone (MTY-02 manufactured by Tayca Corporation).

A particle diameter (D50) of the inorganic pigment having a surface hydrophobicity at a 50% cumulative mean in a volume-basis particle size distribution thereof is preferably from 200 nm to 600 nm, and more preferably from 250 nm to 500 nm. When the particle diameter is in the average secondary particle diameter range described above, it is possible to ensure a printed image a hiding power, and at the same time to suppress clogging of an ink path in an inkjet apparatus and a discharge nozzle and work the apparatus stably.

The particle diameter (D50) at the 50% cumulative mean may be measured with, for example, a granularity distribution analyzer (MICROTRACK UPA-EX150 manufactured by Nikkiso Co., Ltd.).

The content of the inorganic pigment having a surface hydrophobicity is preferably from 1% by mass to 20% by mass, and more preferably from 3% by mass to 15% by mass, relative to the whole amount of the ink.

<Dispersant>

The inorganic pigment having a surface hydrophobicity may be dispersed in water with a water-soluble organic solvent, a dispersant, or the like, and prepared as a pigment dispersion liquid.

The water-soluble organic solvent to be used will be described later.

Examples of the dispersant for dispersing the inorganic pigment having a surface hydrophobicity in a dispersion liquid include a water-soluble resin and a surfactant.

The method for dispersing may be a general-purpose equipment such as ultrasonic irradiation, a homogenizer, a ball mill, a beads mill, a paint shaker, etc.

It is possible to prepare the pigment dispersion liquid as an ink by mixing it with a vehicle. The prepared ink can be used favorably for inkjet recording purposes.

<<Water-Soluble Resin>>

Examples of the water-soluble resin include a block copolymer or a random copolymer made of at least two selected from the group consisting of styrene, a styrene derivative, a vinyl naphthalene derivative, aliphatic alcohol ester, etc. of α,β-ethyleny unsaturated carboxylic acid, an acrylic acid, an acrylic acid derivative, a maleic acid, a maleic acid derivative, an itaconic acid, an itaconic acid derivative, a fumaric acid, and a fumaric acid derivative, or a salt of the block copolymer or the random copolymer.

These water-soluble resins are alkali-soluble resins that are soluble in an aqueous solution in which a base is dissolved. Among these resins, those having a weight average molecular weight of from 3,000 to 20,000 are preferable because when used for an ink, such resins can suppress the viscosity of the dispersion liquid and can easily disperse.

The content of the water-soluble resin is preferably from 0.1% by mass to 10% by mass relative to the whole amount of the ink.

<<Surfactant>>

Examples of the surfactant include an anionic surfactant, a nonionic surfactant, an amphoteric surfactant, an acetylene glycol-based surfactant, a fluorosurfactant, and a silicone-based surfactant. It is preferable to select from among these, a surfactant that does not spoil dispersion stability, depending on the combination of the inorganic pigment having a surface hydrophobicity and the water-soluble organic solvent.

The surfactant is not particularly limited to these, and one of these may be used alone or more than one of these may be used as a mixture. Even if a given surfactant does not easily dissolve in an ink alone, it may be solubilized and present stably in an ink when mixed with any other.

Examples of the anionic surfactant include polyoxyethylene alkylether acetic acid salt, a dodecylbenzene sulfonic acid salt, a succinic acid ester sulfonic acid salt, a lauric acid salt, and a polyoxyethylene alkylether sulfate salt.

Examples of the nonionic surfactant include polyoxyethylene alkyl ether, polyoxyethylene polyoxypropylene alkylether, polyoxyethylene alkylester, polyoxyethylene polyoxypropylene alkylester, polyoxyethylene sorbitan fatty acid ester, polyoxyethylene alkylphenylether, polyoxyethylene alkylamine, and polyoxyethylene alkylamide.

Examples of the amphoteric surfactant include a lauryl amino propionic acid salt, lauryldimethyl betaine, stearyldimethyl betaine, and lauryldihydroxyethyl betaine. Specific examples include lauryldimethyl amine oxide, myristyldimethyl amine oxide, stearyldimethyl amine oxide, dihydroxyethyl laurylamine oxide, polyoxyethylene palm oil alkyldimethyl amine oxide, dimethylalkyl (palm) betaine, and dimethyl lauryl betaine.

Examples of the acetylene glycol-based surfactant include acetylene glycol-based products such as 2,4,7,9-tetramethyl-5-desine-4,7-diol, 3,6-dimethyl-4-octyne-3,6-diol, and 3,5-dimethyl-1-hexin-3-ol (e.g., SURFYNOL 104, 82, 465, 485, and TG manufactured by Air Products and Chemicals, Inc.).

Examples of the fluorosurfactant include a perfluoroalkyl sulfonic acid salt, a perfluoroalkyl carboxylic acid salt, a perfluoroalkyl phosphoric acid ester, a perfluoroalkyl ethylene oxide adduct, perfluoroalkyl betaine, a perfluoroalkylamine oxide compound, a polyoxyalkylene ether polymer having a perfluoroalkyl ether group in a side chain or a sulfuric acid ester salt thereof, and a fluoro-aliphatic polymer ester.

Examples of commercially available products of the fluorosurfactant include: SURFLON S-111, S-112, S-113, S121, S131, S132, S-141, and S-145 (manufactured by Asahi Glass Co., Ltd.); FLUORAD FC-93, FC-95, FC-98, FC-129, FC-135, FC-170C, FC-430, FC-431, and FC-4430 (manufactured by Sumitomo 3M Limited); FT-110, 250, 251, and 400S (manufactured by Neos Company Limited); ZONYL FS-62, FSA, FSE, FSJ, FSP, TBS, UR, FSO, FSO-100, FSN N, FSN-100, FS-300, and FSK (manufactured by Du Pont Kabushiki Kaisha); and POLYFOX PF-136A, PF-156A, and PF-151N (manufactured by Omnova Solutions Inc.). One of these may be used alone, or two or more of these may be used in combination.

The silicone-based surfactant is not particularly limited, and an arbitrary silicone-based surfactant may be selected according to the purpose. However, a silicone-based surfactant that does not decompose at a high pH is preferable. Examples of such silicone-based surfactants include a side chain-modified polydimethyl siloxane, a both terminal-modified polydimethyl siloxane, a one terminal-modified polydimethyl siloxane, and a side chain/both terminal-modified polydimethyl siloxane. Among these, a polyether-modified silicone-based surfactant having a polyoxyethylene group and a polyoxyethylene polyoxypropylene group as modifying groups is particularly preferable.

The polyether-modified silicone-based surfactant may be a commercially available product, examples of which include KF-618, KF-642, and KF-643 (all manufactured by Shin-Etsu Chemical Co., Ltd.).

The content of the surfactant is preferably from 0.01% by mass to 5% by mass, and more preferably from 0.5% by mass to 2% by mass, relative to the whole amount of the ink. When the content is less than 0.01% by mass, addition of the surfactant may be ineffective. When the content is greater than 5% by mass, the ink may permeate a recording medium more than necessary, which may result in such problems as a low image density and occurrence of a bleed-through.

<Resin Particles>

The resin particles have properties of thickening and agglomerating upon landing of the ink on a recording medium, and have an effect of suppressing permeation of the colorant component and promoting fixing thereof on the recording medium. Further, some kinds of resin particles have an effect of forming a film over a recording medium and improving scratch resistance of the print. Furthermore, addition of the resin particles improves dispersion stability of the inorganic pigment having a surface hydrophobicity. Moreover, in the present invention, the resin particles have an effect of suppressing settling of the inorganic pigment having a surface hydrophobicity, and improving re-dispersibility thereof even if it settles.

Examples of the resin particles include styrene acrylic resin particles, acrylic silicone resin particles, polyurethane resin particles, and acrylic urethane resin particles. Among these, polyurethane resin particles are particularly preferable.

The resin particles are present in the form of solid particles when used as a material for ink production or after ink production.

The polyurethane resin particles include a type that is obtained by granulating a relatively hydrophilic polyurethane resin by externally using an emulsifier, and a self-emulsifying type obtained by incorporating a functional group that serves as an emulsifier into the resin itself by means of copolymerization or the like. The present invention may be carried out with either type. However, care must be taken because depending on the combination in the ink composition, there may be some difference in the dispersion stability of the inorganic pigment having a surface hydrophobicity and the resin particles. Resin particles that always have excellent dispersion stability without fail in any combination of the inorganic pigment having a surface hydrophobicity and the dispersant are anionic self-emulsifying polyurethane resin particles. In this case, the polyurethane-based resin is more preferably an ether type than a polyester type and a polycarbonate type, in terms of fastness and dispersion stability of the inorganic pigment having a surface hydrophobicity. Many non-ether types have a poor solvent resistance and tend to viscously agglomerate during storage of the ink at a high temperature, although the reasons are uncertain.

The resin particles may be a commercially available product. Examples of commercially available products include: J-450, J-734, J-7600, J-352, J-390, J-7100, J-741, J74J, J-511, J-840, J-775, HRC-1645, and HPD-71 (styrene-acrylic resin particles, all manufactured by Johnson Polymer, LLC); UVA383MA (acrylic-silicone resin particles, manufactured by BASF Japan Ltd.); AP4710 (acrylic-silicone resin particles, manufactured by Showa Highpolymer Co., Ltd.); SF460, SF460S, SF420, SF110, SF300, and SF361 (polyurethane resin particles, all manufactured by NUC Corporation); and ACRIT WEM-321U (acrylic urethane resin particles, manufactured by Taisei Kako Co., Ltd.). One of these may be used alone, or two or more of these may be used in combination.

The content of the resin particles is preferably from 0.1% by mass to 20% by mass, and more preferably from 0.2% by mass to 10% by mass, relative to the whole amount of the ink. When the content is less than 0.1% by mass, dispersibility and re-dispersibility of the inorganic pigment having a surface hydrophobicity may be poor, and an amount of the resin to cover the inorganic pigment having a surface hydrophobicity after the ink lands on a recording medium may be insufficient, resulting in a poor effect of scratch resistance. When the content is greater than 20% by mass, the ink may have an excessively high viscosity and may be difficult to print by an inkjet system.

<Water-Soluble Organic Solvent>

In the present invention, by mixing a water-soluble organic solvent with water as a dispersion medium and controlling the hydrophilicity of the dispersion medium, it is possible not only to disperse the inorganic pigment having a surface hydrophobicity uniformly, but also to make the inorganic pigment having a surface hydrophobicity less susceptible to settling in the dispersion liquid and make it easily re-disperse even if it settles.

The water-soluble organic solvent is not particularly limited, and an arbitrary water-soluble organic solvent may be selected according to the purpose. Examples thereof include multivalent alcohols, multivalent alcohol alkyl ethers, multivalent alcohol aryl ethers, nitrogen-containing heterocyclic compounds, amides, amines, sulfur-containing compounds, propylene carbonate, and ethylene carbonate.

Examples of the multivalent alcohols include ethylene glycol, polyethylene glycol, propylene glycol, dipropylene glycol, tripropylene glycol, polypropylene glycol, 1,5-pentanediol, 2-methyl-2,4-pentanediol, hexylene glycol, 1,6-hexanediol, 1,2,6-hexanetriol, trimethylolethane, trimethylolpropane, 3-methyl-1,3-hexanediol, propylpropylene diglycol, glycerin, 1,3-butanediol, 1,2,3-butanetriol, 1,2,4-butanetirol, diglycerin, triethylene glycol, tetraethylene glycol, diethylene glycol, 3-methyl-1,3-butanediol, and 3-methoxy-3-methyl-1-butanol. One of these may be used alone, or two or more of these may be used in combination.

Examples of the multivalent alcohol alkyl ethers include ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, propylene glycol monoethyl ether, and triethylene glycol dimethyl ether. One of these may be used alone, or two or more of these may be used in combination.

Examples of the multivalent alcohol aryl ethers include ethylene glycol monophenyl ether, and ethylene glycol monobenzyl ether.

Examples of cyclic ethers include epoxies, oxetanes, tetrahydrofurans, tetrahydropyrans, and crown ether.

Examples of the amines include monoethanol amine, diethanol amine, triethanol amine, N,N-dimethylmonoethanol amine, N-methyldiethanol amine, N-methylethanol amine, N-phenylethanol amine, and 3-aminopropyl diethyl amine.

Examples of the amide compounds include 2-pyrrolidone, N-methyl-2-pyrrolidone, 1,3-dimethyl-2-imidazolidinone, ε-caprolactam, γ-butyrolactone, β-methoxy-N,N-dimethyl propionamide, and β-butoxy-N,N-dimethyl propionamide.

Examples of the sulfur-containing compounds include dimethyl sulfoxide, sulfolane, and thiodiglycol.

The content of the water-soluble organic solvent is preferably from 10% by mass to 50% by mass, and more preferably from 15% by mass to 40% by mass, relative to the whole amount of the ink. When the content is less than 15% by mass, ink discharge stability may be poor, and a non-volatile component may be deposit and adhere to a maintenance device of an inkjet recording apparatus. On the other hand, when the content is greater than 50% by mass, a non-volatile component may deposit due to even a slight desiccation, and the ink may have a poor drying property on a recording medium and may take a long time to dry.

<Other Components>

The other components are not particularly limited, and arbitrary components may be selected according to necessity. Examples thereof include a permeant, a pH adjustor, an antiseptic/mildewcide, a chelate reagent, an anticorrosive agent, an oxygen absorber, and a photostabilizing agent.

—Permeant—

Examples of the permeant include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. One of these may be used alone, or two or more of these may be used in combination. Among these, 2-ethyl-1,3-hexanediol, and 2,2,4-trimethyl-1,3-pentanediol are preferable.

Examples of other permeants include: alkyl and aryl ethers of multivalent alcohols, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

The content of the permeant is preferably from 0.1% by mass to 4% by mass relative to the whole amount of the ink. When the content is less than 0.1% by mass, a quick drying property may not be obtained and an image may be smudged. When the content is greater than 4% by mass, such problems may occur that dispersion stability of the inorganic pigment having a surface hydrophobicity is lost, a nozzle is clogged, and the ink has a more than necessary permeability to a recording medium to result in a low image density or cause a bleed-through.

—pH Adjustor—

The pH adjustor is not particularly limited, and an arbitrary pH adjustor may be selected according to the purpose as long as it can adjust pH to a value of from 7 to 11 without giving adverse influence to the ink in which it is mixed. Examples thereof include alcohol amines, hydroxides of alkali metal elements, ammonium hydroxides, phosphonium hydroxides, and alkali metal carbonates.

When the pH is lower than 7 or higher than 11, erosion of an inkjet head or an ink supply unit by the ink may be large, and troubles such as property changes, leakage, and discharge failure of the ink may occur.

Examples of the alcohol amines include diethanol amine, triethanol amine, and 2-amino-2-ethyl-1,3-propanediol.

Examples of the hydroxides of alkali metal elements include lithium hydroxide, sodium hydroxide, and potassium hydroxide.

Examples of the ammonium hydroxides include ammonium hydroxide, and quaternary ammonium hydroxide.

Examples of the phosphonium hydroxides include quaternary phosphonium hydroxide.

Examples of the alkali metal carbonates include lithium carbonate, sodium carbonate, and potassium carbonate.

—Antiseptic/Mildewcide—

Examples of the antiseptic/mildewcide include sodium dehydroacetate, sodium sorbate, sodium-2-pyridinethiol-1-oxide, sodium benzoate, and sodium pentachlorophenol.

Examples of the chelate reagent include sodium ethylene diamine tetraacetate, sodium nitrilotriacetate, sodium hydroxyethyl ethylene diamine triacetate, sodium diethylenetriamine pentaacetate, and sodium uramil diacetate.

Examples of the anticorrosive agent include acidic sulfite, sodium thiosulfate, ammonium thiodiglycolate, diisopropyl ammonium nitrite, pentaerythritol tetranitrate, and dicyclohexyl ammonium nitrite.

—Antioxidant—

Examples of an antioxidant include a phenol-based antioxidant (including a hindered phenol-based antioxidant), an amine-based antioxidant, a sulfur-based antioxidant, and a phosphorus-based antioxidant.

Examples of the phenol-based antioxidant (including a hindered phenol-based antioxidant) include butylated hydroxy anisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis{1,1-dimethyl-2-[β-(3-tert-butyl-4-hydroxy-5-methylphenyl) propnionyloxy]ethyl}-2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl) propionate]methane.

Examples of the amine-based antioxidant include phenyl-β-naphthyl amine, α-naphthyl amine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane, and 1,1,3-tris(2-methyl-4-hydroxy-5-tert-butylphenyl)butane.

Examples of the sulfur-based antioxidant include dilauryl-3,3'-thiodipropionate, distearyl thiodipropionate, lauryl stearyl thiodipropionate, dimyristyl-3,3'-thiodipropionate, distearyl-β,β'-thiodipropionate, 2-mercaptobenzoimidazole, and dilauryl sulfide.

Examples of the phosphorus-based antioxidant include triphenyl phosphite, octadecyl phosphite, triisodecyl phosphite, trilauryl trithiophosphite, and trinonyl phenyl phosphite.

—Ultraviolet Absorber—

Examples of an ultraviolet absorber include a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

Examples of the benzophenone-based ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole-based ultraviolet absorber include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate-based ultraviolet absorber include phenyl salicylate, p-tert-butylphenyl salicylate, and p-octylphenyl salicylate.

Examples of the cyanoacrylate-based ultraviolet absorber include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of the nickel complex salt-based ultraviolet absorber include nickelbis(octylphenyl)sulfide, 2,2'-thiobis(4-tert-octylferrate)-n-butyl amine nickel(II), 2,2'-thiobis(4-tert-octylferrate)-2-ethylhexyl amine nickel(II), and 2,2'-thiobis(4-tert-octylferrate)triethanol amine nickel(II).

<Ink Production Method>

The ink is produced by dispersing or dissolving a pigment dispersion liquid containing the inorganic pigment having a surface hydrophobicity, the resin particles, the dispersant, the water-soluble organic solvent, and water, and according to necessity, any other components in an aqueous medium, and according to necessity, stirring and mixing them. The stirring and mixing may be performed with, for example, a sand mill, a homogenizer, a ball mill, a paint shaker, an ultrasonic disperser, etc. The stirring and mixing may be performed with a stirrer using an ordinary stirring blade, a magnetic stirrer, a high-speed disperser, etc.

<<Physical Properties of Ink>>

Physical properties of the ink are not particularly limited, and may be appropriately selected according to the purpose. For example, the viscosity and the surface tension of the ink are preferably in the ranges described below.

The viscosity of the ink at 25° C. is preferably from 5 mPa·s to 25 mPa·s. When the viscosity is 5 mPa·s or greater, an effect of improving a print density and character appearance quality is obtained. When the viscosity is suppressed to 25 mPa·s or less, ink dischargeability is ensured.

The viscosity can be measured at 25° C. with, for example, a viscometer (RE-550L manufactured by Toki Sangyo Co., Ltd.).

The surface tension of the ink is preferably 30 mN/m or less, and more preferably 28 mN/m or less at 25° C. When the surface tension is mN/m or less, the ink has a good permeability and causes less beading, which leads to a good drying property during printing on regular paper. Further, the ink has a good wettability with a pre-treatment layer, which leads to a good color development property and white spot suppression. On the other hand, when the surface tension is greater than 30 mN/m, the ink tends to be leveled over a recording medium, and may take a long time to dry (have a poor drying property).

The ink can be used favorably in a printer mounted with any types of inkjet heads, such as a piezo type that uses a piezoelectric element as a pressure generation unit for pressurizing the ink in an ink flow path, and deforming a vibration plate that forms the wall surface of the ink flow path to thereby change the cubic capacity within the ink flow path and discharge ink droplets (see JP-A No. 02-51734), a so-called thermal type that heats the ink within an ink flow path with a heat generating resistor and generates bubbles (see JP-A No. 61-59911), and an electrostatic type that deforms a vibration plate that forms the wall surface of an ink flow path with an electrostatic force generated between the vibration plate and an electrode disposed opposite to the vibration plate, to thereby change the cubic capacity within the ink flow path and discharge ink droplets (see JP-A No. 06-71882).

The ink can also be used in a printer or the like that has a function of promoting print fixing by heating a recording medium and the ink at from 50° C. to 200° C. during, before, or after printing.

The ink of the present invention can be recorded on various surfaces including a base material having a low luminosity such as a black base material, and a transparent base material with a sufficient whiteness and a high visibility. Therefore, the ink is useful for the purposes of marking on industrial products such as plastic products.

Further, the colorant of the ink, that is, the inorganic pigment hardly settles, and can easily re-disperse even if it settles. Therefore, the ink can be used for various purposes including an inkjet recording ink and a coating material. However, it is preferable that the ink be used as an inkjet recording ink described below.

(Ink Cartridge)

An ink cartridge of the present invention includes the ink of the present invention described above, and a container, and further includes other members such as an ink bag according to necessity. Hence, in an ink replacement operation or the like, there is no need of directly touching the ink, there is no risk of fingers or wears being contaminated, and mixing of foreign matters such as dirt into the ink can be prevented.

The container is not particularly limited, and the shape, structure, size, material, etc. thereof may be appropriately selected according to the purpose. A preferable example of the container is one that includes an ink bag formed of an aluminum laminate film, a resin film, or the like.

Figure 1:
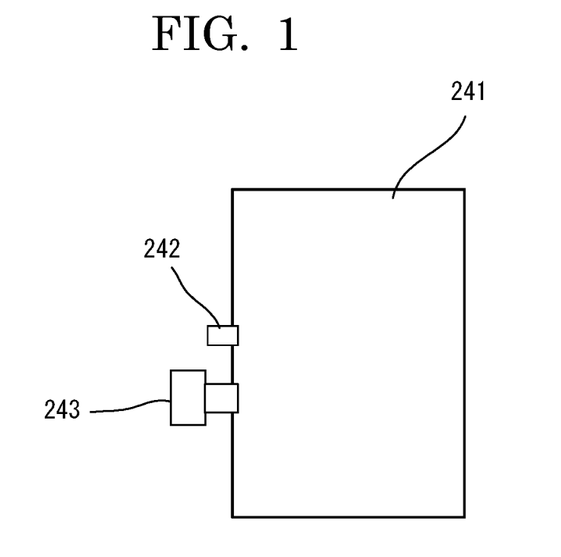
FIG. 1 is a schematic diagram showing an example of an ink cartridge.
Figure 2:
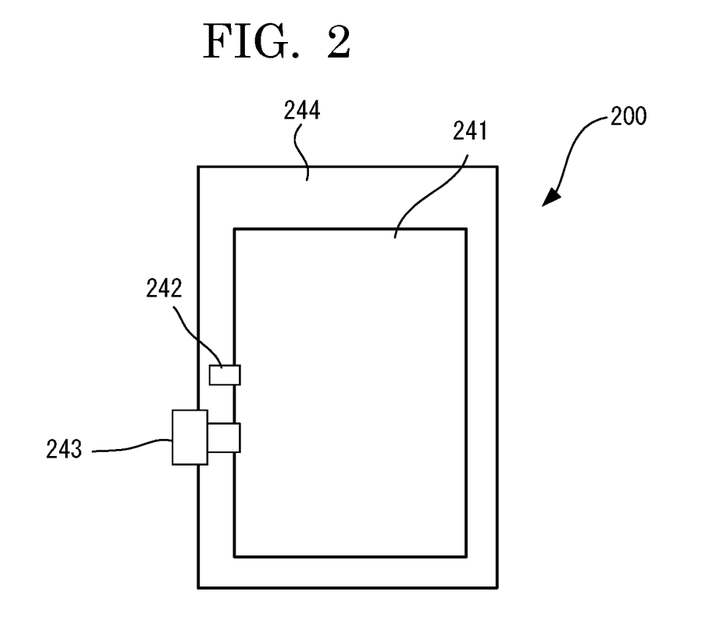
FIG. 2 is a schematic diagram of the ink cartridge of FIG. 1, including the case thereof.

The ink cartridge will be explained below with reference to FIG. 1 and FIG. 2. FIG. 1 is a schematic diagram showing an example of an ink bag 241 of the ink cartridge. FIG. 2 is a schematic diagram showing an ink cartridge 200 that includes the ink bag 241 of FIG. 1, and a cartridge case 244 housing the ink bag.

As shown in FIG. 1, the ink bag 241 is filled with the ink through an ink injection port 242, deaerated of any residual air therein, and then closed at the ink injection port 242 by fusion bonding. For use, an ink discharge port 243 formed of a rubber material is pierced with a needle of the apparatus body for the ink to be supplied into the apparatus. The ink bag 241 is formed of a packaging material having no gas permeability, such as an aluminum laminate film. Then, typically, the ink bag is housed in a cartridge case 244 formed of a plastic as shown in FIG. 2, and as a thusly obtained ink cartridge 200, mounted on an inkjet recording apparatus attachably and detachably.

It is preferable that the ink cartridge be attachable to and detachable from an inkjet recording apparatus. This makes it possible to simplify an ink refill or replacement work and improve the work efficiency.

(Inkjet Recording Method and Inkjet Recording Apparatus)

An inkjet recording apparatus of the present invention includes at least an ink flying unit, and further includes other units appropriately selected according to necessity, such as an impulsion generation unit and a control unit.

An inkjet recording method of the present invention includes at least an ink flying step, and further includes other steps appropriately selected according to necessity, such as an impulsion generating step and a control step.

The inkjet recording method of the present invention can be performed favorably by the inkjet recording apparatus of the present invention. The ink flying step can be performed favorably by the ink flying unit. The other steps can be performed favorably by the other units.

—Ink Flying Step and Ink Flying Unit—

The ink flying step is a step of applying an impulsion to the ink of the present invention described above to fly the inkjet recording ink to thereby form an image.

The ink flying unit is a unit configured to apply an impulsion to the ink of the present invention described above to fly the inkjet recording ink to thereby form an image. The ink flying unit is not particularly limited, and examples thereof include an inkjet head.

The inkjet head may be any of a piezo type that uses a piezoelectric element as a pressure generation unit for pressurizing the ink in an ink flow path, and deforming a vibration plate that forms the wall surface of the ink flow path to thereby change the cubic capacity within the ink flow path and discharge ink droplets (see JP-A No. 02-51734), a so-called thermal type that heats the ink within an ink flow path with a heat generating resistor and generates bubbles (see JP-A No. 61-59911), an electrostatic type that deforms a vibration plate that forms the wall surface of an ink flow path with an electrostatic force generated between the vibration plate and an electrode disposed opposite to the vibration plate, to thereby change the cubic capacity within the ink flow path and discharge ink droplets (see JP-A No. 06-71882), etc.

The impulsion can be generated with, for example, the impulsion generation unit. The impulsion is not particularly limited, and an arbitrary impulsion may be selected according to the purpose. Examples thereof include heat (temperature), pressure, vibration, and light. One of these may be used alone, or two or more of these may be used in combination. Among these, heat and pressure are preferable.

Examples of the impulsion generation unit include a heater, a pressure device, a piezoelectric element, a vibration generator, an ultrasonic oscillator, and a light. Specific examples include a piezoelectric actuator such as a piezoelectric element, a thermal actuator that uses an electrothermal conversion element such as a heat generating resistor to utilize a phase change due to film boiling of a liquid, a shape-memory-alloy actuator that utilizes a metal phase change due to a temperature change, and an electrostatic actuator that utilizes an electrostatic force.

The method for flying the ink is not particularly limited, and different methods are used depending on the kinds of the impulsion. For example, when the impulsion is "heat", the ink flying method may be to apply a thermal energy corresponding to a recording signal to the ink in a recording head by means of, for example, a thermal head, to generate bubbles in the ink by the thermal energy, and jet out the ink from nozzle holes of the recording head in the form of liquid droplets by the pressure of the bubbles. When the impulsion is "pressure", the ink flying method may be to apply a voltage to a piezoelectric element bonded at a position in a so-called pressure chamber provided in an ink flow path in a recording head, to bend the piezoelectric element and shrink the cubic capacity in the pressure chamber, to thereby jet out the ink from nozzle holes of the recording head in the form of liquid droplets.

The size of the liquid droplets of the ink to be flown is preferably from 3 pl to 40 pl, for example. The speed at which the ink droplets are jetted out is preferably from 5 m/s to 20 m/s. The drive frequency of the ink droplets is preferably 1 kHz or greater. The resolution of the ink droplets is preferably 300 dpi or greater.

The control unit is not particularly limited, and an arbitrary control unit may be selected according to the purpose as long as it can control the operations of each unit. Examples thereof include devices such as a sequencer and a computer.

Figure 3:
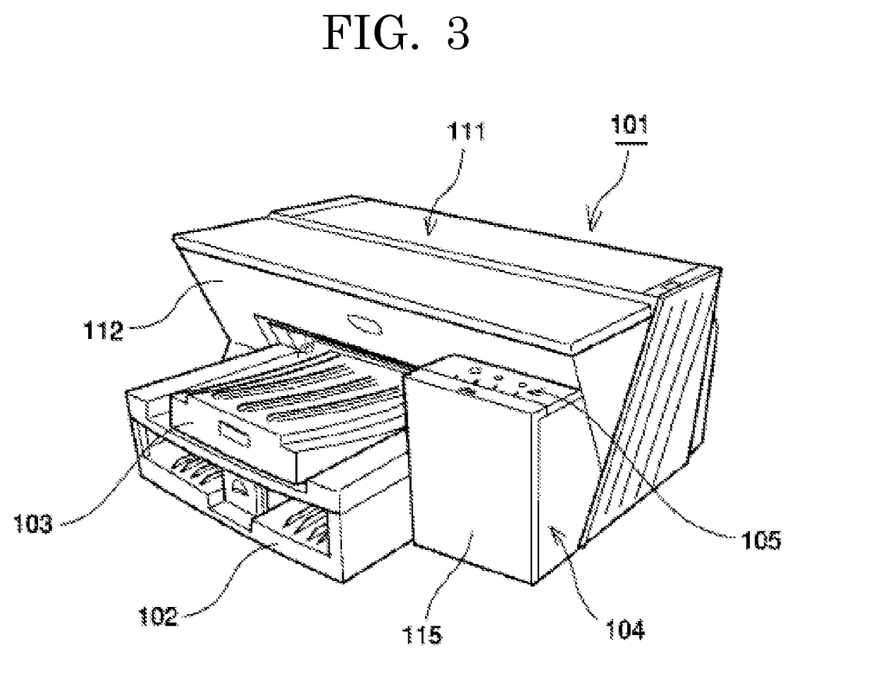
FIG. 3 is a perspective diagram showing an example of an inkjet recording apparatus.

Here, an inkjet recording apparatus shown in FIG. 3 includes an apparatus body 101, a paper feeding tray 102 attached to the apparatus body 101 and configured to feed sheets, and a paper ejection tray 103 attached to the apparatus body 101 and configured to be stocked with sheets on which an image has been recorded (formed). A top surface of a top cover 111 of the apparatus body 101 is an approximately flat surface. A front surface 112 of a front cover of the apparatus body 101 is inclined rearward obliquely with respect to the top surface. The paper ejection tray 103 and the paper feeding tray 102 are provided below the inclined front surface 112 so as to protrude frontward (toward the shallower side). An ink cartridge loading portion 104 is provided at an end of the front surface 112 at a portion lower than the top cover 111, so as to protrude frontward from the front surface 112. An operation unit 105 including operation keys, a display, etc. is provided on the top surface of the ink cartridge loading portion 104. The ink cartridge loading portion 104 has an openable/closable front cover 115 for an ink cartridge to be attached and detached.

Figure 4:
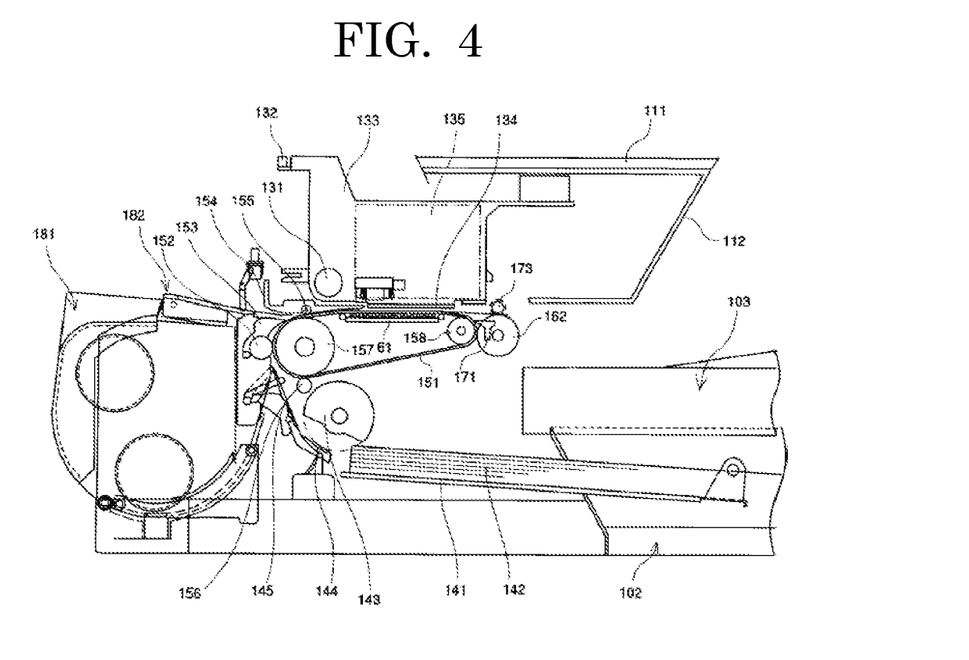
FIG. 4 is a schematic diagram showing another example of an inkjet recording apparatus.
Figure 5:
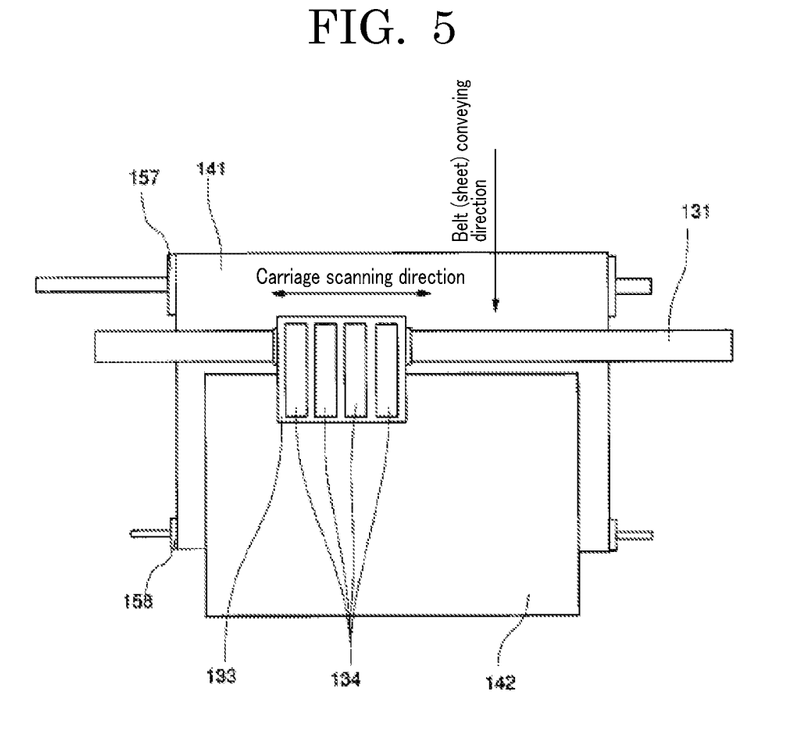
FIG. 5 is a schematic plan view of a main portion, showing an example of a mechanical portion of an inkjet recording apparatus.

As shown in FIG. 4 and FIG. 5, in the apparatus body 101, a carriage 133 is supported slidably in a main-scanning direction by a guide rod 131 and a stay 132, which are guide members bridged laterally between unillustrated left and right side panels, and is moved and scanned in a carriage scanning direction of FIG. 5 by an unillustrated main scanning motor.

The carriage 133 is loaded with four recording heads 134, which are inkjet heads configured to discharge ink droplets of yellow, cyan, magenta, and black, respectively. A plurality of ink discharge ports of each recording head are arranged in a direction perpendicular to the main-scanning direction, and an ink discharging side of each recording head faces downward.

The head constituting the recording head 134 may be a head that includes as an energy generation unit for discharging an ink, a piezoelectric actuator such as a piezoelectric element, a thermal actuator that uses an electrothermal conversion element such as a heat generating resistor to utilize a phase change due to film boiling of a liquid, a shape-memory-alloy actuator that utilizes a metal phase change due to a temperature change, an electrostatic actuator that utilizes an electrostatic force, or the like.

A nozzle surface as an ink discharging portion of each inkjet head is provided with a layer made of codeposited Ni/PTFE, a silicone resin, and a fluorine-based water repellency imparting agent, in order for discharge stability and a wiping property to be improved. In the present invention, a surface energy on an inner wall of a nozzle hole is determined depending on the liquid to be discharged. It is more effective if a surface energy on the nozzle surface is determined adaptively to the surface energy on the inner wall of a nozzle hole. Hence, a treatment similar to that applied to the nozzle surface should also be applied to the inner wall of a nozzle hole, according to necessity.

The carriage 133 is mounted with sub tanks 135 for the respective colors, which are configured to supply inks of the respective colors to the respective recording heads 134. The sub tanks 135 are refilled and supplied with the inks from the ink cartridges loaded on the ink cartridge loading portion 104 through unillustrated ink feeding tubes. A paper feeding unit configured to feed sheets 142 stacked on a sheet stacker (pressure plate) 141 of the paper feeding tray 102 includes a half-moon roll (paper feeding roll) 143 configured to feed sheets one by one separately, and a separation pad 144 opposed to the paper feeding roll 143 and made of a material having a large friction coefficient. The separation pad 144 is biased by the paper feeding roll 143.

A conveying unit configured to convey the sheet 142 fed by the paper feeding unit below the recording heads 134 includes a conveyor belt 151 configured to convey the sheet by electrostatic adsorption, a counter roller 152 configured to convey the sheet 142 fed from the paper feeding unit via a guide 145 by sandwiching it between itself and the conveyor belt 151, a conveyor guide 153 configured to change the direction of the sheet 142 conveyed approximately vertically upward by approximately 90° to make the sheet follow the conveyor belt 151, and a leading end pressurizing roll 155 biased toward the conveyor belt 151 by a pressing member 154. It also includes a charging roller 156 which is a charging unit configured to electrically charge the surface of the conveyor belt 151.

The conveyor belt 151 is an endless belt, and hung between a conveyor roller 157 and a tension roller 158 to move around in a belt conveying direction. The conveyor belt 151 includes a surface layer that is made of a resin material resistively uncontrolled and having a pure thickness of about 40 µm, e.g., an ETFE pure material, and serves as a paper adsorbing surface, and a back layer (an intermediate resistance layer, or an earth layer) made of the same material as that of the surface layer and resistively controlled with carbon. A guide member 61 is provided on the back side of the conveyor belt 151 at a position corresponding to a region where the recording heads 134 perform printing. A paper ejection unit configured to eject a sheet 142 having had a print recorded by the recording heads 134 includes a separation claw 171 configured to separate the sheet 142 from the conveyor belt 151, a paper ejection roller 162 and a paper ejection roll 173, and the paper ejection tray 103 below the paper ejection roller 162. A both-side paper feeding unit 181 is mounted attachably and detachably on the rear surface of the apparatus body 101. The both-side paper feeding unit 181 retrieves a sheet 142 that is returned by the conveyor belt 151 being rotated in a reverse direction, and feeds it again to between the counter roller 152 and the conveyor belt 151 by overturning it. A manual paper feeding portion 182 is provided on the top of the both-side paper feeding unit 181.

In the inkjet recording apparatus configured in this way, sheets 142 are fed from the paper feeding unit one by one separately. A sheet 142 fed approximately vertically upward is guided by the guide 145, is conveyed by being sandwiched between the conveyor belt 151 and the counter roller 152, and with its leading end guided by the conveyor belt 153 and pressed by the leading end pressurizing roll 155 onto the conveyor belt 151, has its conveying direction changed by approximately 90°. At the moment, the conveyor belt 151 has been electrically charged by the charging roller 156, and the sheet 142 is conveyed by being electrostatically adsorbed to the conveyor belt 151. Hence, by the recording heads 134 being driven in response to image signals while the carriage 133 is moved, ink droplets are discharged and one line is recorded on the sheet 142 that is being stopped, and then the next line is recorded thereon after the sheet 142 is conveyed by a predetermined amount. Upon reception of a recording completion signal or a signal indicating that the rear end of the sheet 142 has reached the recording region, the recording operation is terminated, and the sheet 142 is ejected onto the paper ejection tray 103. When the amount of residual ink in any sub tank 135 is detected to be "near end", a predetermined amount of ink is replenished into the sub tank 135 from the ink cartridge.

Figure 6:
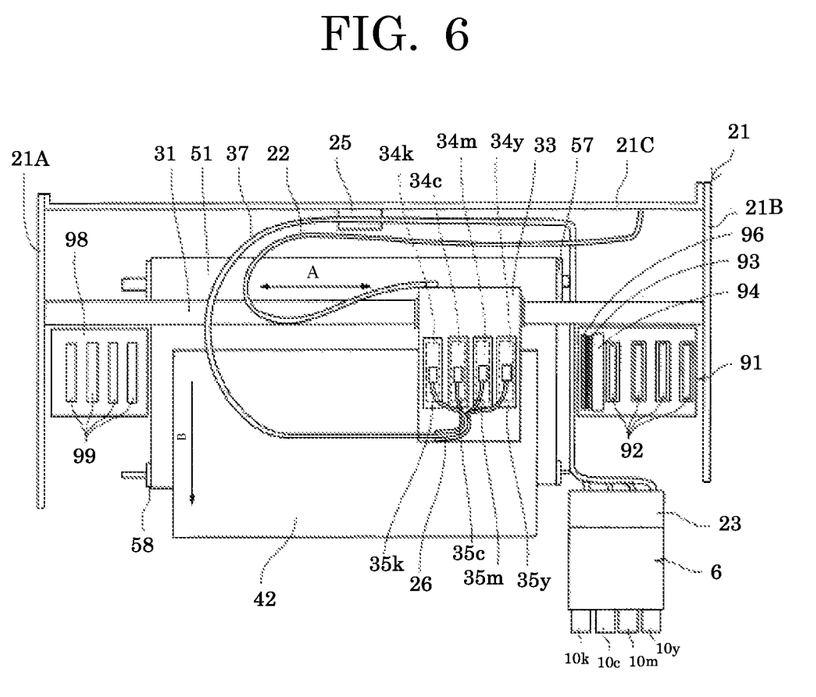
FIG. 6 is a schematic plan view showing an example of a mechanical portion of an inkjet recording apparatus, where A represents a carriage main-scanning direction, and B represents a belt conveying direction (sub-scanning direction).

As shown in FIG. 6, a maintenance device 91 according to the present invention configured to maintain and restore the conditions of the nozzles of the recording heads 34 is provided at a non-printing region at one side in the scanning direction of the carriage 33.

The maintenance device 91 includes caps 92 configured to cap the nozzle surfaces of the recording heads 34 respectively, a wiper blade 93 configured to wipe the nozzle surfaces, a blank discharge receptacle 94 configured to receive liquid droplets during blank discharge of discharging liquid droplets that do not contribute to recording in order to remove thickened inks, a wiper cleaner 94 molded integrally with the blank discharge receptacle and serving as a cleaning member for removing inks adhered to the wiper blade 93, and a cleaner roll 96 constituting a cleaner member for pressing the wiper blade 93 onto the wiper cleaner during cleaning of the wiper blade 93.

With the configuration described above, the wiper blade 93 is stuck up to the moving path of the recording heads 34 when the recording heads pass the position of the wiper blade 93, and as a result, the discharge ports of the recording heads 34 are wiped.

<Ink Recorded Matter>

An ink recorded matter of the present invention includes a base material, and an image formed on the base material with the ink of the present invention described above.

The base material is not particularly limited, and an arbitrary base material may be selected according to the purpose unless it is a white base material. Examples thereof include gloss paper, special paper, cloth, an OHP sheet, and a film. Among these, a non-porous base material such as a film is preferable.

Here, the non-porous base material means such materials as a resin film having a surface made of a plastic material, including a transparent or colored polyvinyl chloride film, a polyethylene terephthalate (PET) film, a polycarbonate film, a polyethylene film, an acrylic film, a polypropylene film, a polyimide film, and a polystyrene film, laminated paper, coated paper, glass, and metals, that do not contain in the surface thereof, a paper component such as wood paper, Japan paper, synthetic pulp paper, and a synthetic fiber. One of these may be used alone, or two or more of these may be used in combination.

A pigment ink containing an inorganic pigment as a colorant can be a white ink when a white material is used as the inorganic pigment. Such a white ink can not only be used favorably for recording on a recording medium other than a white one, but such a white ink can be used for image formation for recording on a transparent medium such as an OHP sheet. Furthermore, by applying such a white ink over a transparent recording medium to form a white layer, and then forming an image thereon with an ink of a different color, it is possible to obtain a clearer image having a high image quality. In this case, it is possible to firstly form a white layer over the transparent medium by applying the ink of the present invention, and then form an image over the white layer with inks such as a black ink and a color ink. It is also possible to obtain a clear image by applying the ink of the present invention after forming an image over a transparent medium with inks such as a black ink and a color ink.

The black ink and the color ink are not particularly limited, and may be the inks disclosed in, for example, JP-A No. 2009-280749 and Japanese Patent (JP-B) No. 5304023.

A material other than a white material may also be used as the inorganic pigment. By selecting an inorganic pigment other than a white material, it is possible to form a layer of an arbitrary color.

In the ink of the present invention, the inorganic pigment hardly settles, and can easily re-disperse even if it settles. Therefore, an ink recorded matter obtained by using the ink of the present invention has a high image quality with no smudging and an excellent aging stability, and can be used for various purposes as a handout or the like on which various prints or images are recorded.

EXAMPLES

Examples of the present invention will be explained below. The present invention is not limited to these Examples by any means.
(Preparation Example 1 of Inorganic Pigment Having Surface Hydrophobicity)
—Preparation of Titanium Dioxide Surface-Treated with Silicone—

Titanium dioxide (CR-50 manufactured by Ishihara Sangyo Kaisha, Ltd.) (10 parts by mass) that had been dried with a reduced-pressure dryer at 110° C. for 2 days was added in a 200 mL flask equipped with an isobaric pressure funnel, which was then purged with a nitrogen gas. A solution obtained by diluting a reactive silicone oil (KF-99 manufactured by Shin-Etsu Chemical Co., Ltd.) (2 parts by mass) with a dehydrated toluene (40 parts by mass) was added gradually thereto through the dropping funnel, and they were stirred. After the dropping was completed, they were heated in an oil bath to distill toluene away, and then reacted at 150° C. for 3 hours. After the reaction was completed, a solid content was recovered, washed sufficiently with toluene and then with methanol, and after this, dried at reduced pressure at 60° C. for 1 day, to thereby obtain titanium dioxide surface-treated with silicone.
(Preparation Example 2 of Inorganic Pigment Having Surface Hydrophobicity)
—Preparation of Titanium Dioxide Surface-Treated with Alkyl—

A 5 mM octadecyltrimethoxysilane toluene solution (50 parts by mass), titanium dioxide (CR-50 manufactured by Ishihara Sangyo Kaisha, Ltd.) (10 parts by mass) that had been dried with a reduced-pressure dryer at 110° C. for 2 days, and zirconia beads having a diameter of 4 mm (200 parts by mass) were added and sealed in a glass bottle purged with a nitrogen gas, and after this, reacted for 2 days while being rotated with a mix rotor. After this, the beads were separated therefrom through a sieve, and then a solid content was filtered and recovered. After this, the solid content was washed sufficiently with toluene and then with methanol. After this, the solid content was dried at reduced pressure at 60° C. for 1 day, to thereby obtain titanium dioxide surface-treated with alkyl.
(Preparation Example 3 of Inorganic Pigment Having Surface Hydrophobicity)
—Preparation of Silicon Dioxide Surface-Treated with Silicone—

Silicon dioxide surface-treated with silicone was obtained in the same manner as in Preparation Example 1 of the inorganic pigment having a surface hydrophobicity, except that spherical silica having a particle diameter of 0.4 µm (manufactured by Sakai Chemical Industry Co., Ltd.) was used.
<Evaluation of Surface Hydrophobicity>

In the evaluation of surface hydrophobicity, pure water (10 g) and an inorganic pigment (2 g) were added in a 30 mL sample bottle (SV-30 manufactured by Nichidenrika-Glass Co., Ltd.) in which a stirring bar was put, stirred and mixed at 400 rpm for 10 minutes with a stirrer (MS-2T manufactured by Ishii Laboratory Works Co., Ltd.), and then kept stationary for 30 minutes. In this case, when the inorganic pigment was wholly floating without having settled, it was judged to have a "surface hydrophobicity". When the inorganic pigment had settled even partially, it was judged to have no "surface hydrophobicity".

All of the inorganic pigments having a surface hydrophobicity of Preparation Examples 1 to 3 were evaluated as "having a surface hydrophobicity". Further, $TiO_2$ surface-treated with a hydrophobic silicone (CR-63 manufactured by Ishihara Sangyo Kaisha, Ltd.) and $TiO_2$ surface-treated with a hydrophobic silicone (MTY-02 manufactured by Tayca Corporation), which were to be used in Examples described below, were evaluated as "having a surface hydrophobicity".

In contrast, all of hydrophilized $TiO_2$ (CR-60 manufactured by Ishihara Sangyo Kaisha, Ltd.), hydrophilized $TiO_2$ (CR-50 manufactured by Ishihara Sangyo Kaisha, Ltd.), and non-treated $SiO_2$ (spherical silica having a particle diameter of 0.4 µm, manufactured by Ishihara Sangyo Kaisha, Ltd.) were evaluated as "having no surface hydrophobicity".

Example 1

—Preparation of Dispersion Liquid—

Ion-exchanged water (11.4 parts by mass), 3-methyl-1,3-butanediol (12 parts by mass), and as a dispersant, DISPER-BYK-190 (manufactured by Byk Chemie GmbH) (0.6 parts by mass) were added in a vial container, and stirred lightly and homogenized. After this, the titanium dioxide surface-treated with silicone of Preparation Example 1 (6 parts by mass) was added thereto, and they were irradiated with ultrasonic waves (600 W) at 50° C. for 3 hours, to thereby obtain a dispersion liquid. After the obtained dispersion liquid was slowly cooled to room temperature, a particle diameter (D50) of the dispersion liquid at a 50% cumulative mean in a volume-basis particle size distribution thereof was measured with a granularity distribution analyzer (MICROTRACK UPA-EX150 manufactured by Nikkiso Co., Ltd.), and it was 331 nm.
—Preparation of Vehicle—

A vehicle was prepared by mixing the raw materials described below.

ACRIT WEM-321U (acrylic urethane resin particles, manufactured by Taisei Kako Co., Ltd., with a solid content concentration of 38% by mass)—12.3 parts by mass Glycerin—11.7 parts by mass 1,3-butanediol—35.2 parts by mass 2-ethyl-1,3-hexanediol—6.3 parts by mass
POLYFOX PF-156A (anionic fluorosurfactant, manufactured by Omnova Solutions Inc.)—5.2 parts by mass
PROXEL LV (antiseptic/mildewcide, 1,2-benzisothiazolin-3-one, manufactured by Nitto Denko Avecia Inc.)—0.3 parts by mass
Triethanol amine—0.2 parts by mass
Ion-exchanged water—28.9 parts by mass The prepared dispersion liquid and the vehicle were mixed in equal amounts in a vial container, to thereby prepare an ink.

The viscosity of the obtained ink measured with RE-80L VISCOMETER (manufactured by Toki Sangyo Co., Ltd.) was 11.4 mPa·s at 25° C. A particle diameter (D50) of the inorganic pigment in the ink at a 50% cumulative mean was confirmed to be substantially not different from that of the dispersion liquid.

Next, with the ink of Example 1, a settling property, re-dispersibility, whiteness of a printed image were evaluated in the manners described below. The results are shown in Table 2.

<Settling Property of Inorganic Pigment>

The settling property of the inorganic pigment in the ink was measured with TURBISCAN (MA2000 manufactured by Eko Instruments Co., Ltd.).

The ink was subjected to ultrasonic dispersion (at 100 W, for 40 minutes) with an ultrasonic cleaner (US-3 manufactured by As One Corporation) and homogenized, and then poured into a glass cell specially prepared for the instrument in an amount of 5.5 mL with a pipette. Measurement was performed 30 minutes later when the liquid surface of the ink in the cell had stabilized, and this timing was regarded as a start of evaluation of the settling property. Then, the ink was kept stationary at 23° C., and measured until 240 hours later, to thereby observe the settling property as a deviation with respect to the start of evaluation of the settling property. The settling property was observed mainly by measuring change of backscattering due to production of a supernatant, by performing a cumulative calculation (in a relative value mode) of the peaks of the backscattering, and was evaluated based on the criteria below.

[Evaluation Criteria]
A: A relative change of the backscattering at 240 hours since the start of evaluation was less than 5%.
B: A relative change of the backscattering at 240 hours since the start of evaluation was 5% or greater but less than 10%.
C: A relative change of the backscattering at 240 hours since the start of evaluation was 10% or greater.

<Re-Dispersibility of Settled Inorganic Pigment>

The prepared ink (30 mL) was poured in a 50 mL vial container, and kept stationary at room temperature (25° C.) for 1 month. After this, re-dispersibility of any settled inorganic pigment was evaluated based on the criteria below.

[Evaluation Criteria]
A: When the vial container was shaken with a hand for 10 seconds, the settling of the inorganic pigment disappeared, and the particle diameter before stationary keeping was restored.
B: When the settled inorganic pigment in the vial container was subjected to ultrasonic irradiation (at 100 W) with an ultrasonic cleaner (US-3 manufactured by As One Corporation) for 2 minutes, the settling of the inorganic pigment disappeared, and the particle diameter before stationary keeping was restored.
C: Even when the settled inorganic pigment in the vial container was subjected to ultrasonic irradiation (at 100 W) with an ultrasonic cleaner (US-3 manufactured by As One Corporation) for longer than 2 minutes, the settling of the inorganic pigment did not disappear.

<Whiteness of Printed Image>

The ink was filled in an ink cartridge. Then, with an inkjet printer (IPSIO GX3000 manufactured by Ricoh Company, Ltd.), it was seen to it that all nozzles were filled with the ink and no abnormal image would be produced, and the discharge amount was adjusted such that an amount of ink deposition on a recording medium would be 20 g/m$^2$. After this, a 50 mm×50 mm solid image was printed on an OHP sheet as a recording medium. With a commercially available black sheet underlaid below the printed OHP sheet, the luminosity (L*) of the printed portion was measured with a spectrophotometric densitometer X-RITE 938 (manufactured by X-rite Inc.), and evaluated based on the criteria below. For reference, a L* value measured in a state that an un-printed OHP sheet was overlaid over a black sheet was 22.4

[Evaluation Criteria]
A: L* value was 75 or greater.
B: L* value was 65 or greater but less than 75.
C: L* value was less than 65.

Examples 2 to 11 and Comparative Examples 1 to 3

Inorganic pigment dispersion liquids were prepared in the same manner as in Example 1, except that inorganic pigments and water-soluble organic solvents shown in Table 1 were used unlike in Example 1.

With the obtained inorganic pigment dispersion liquids, inks of Examples 2 to 11 and Comparative Examples 1 to 3 were prepared in the same manner as in Example 1.

With each of the obtained inks, a settling property, re-dispersibility, whiteness of a printed image were evaluated in the same manner as in Example 1. The results are shown in Table 2.

Example 12

An ink was prepared in the same manner as in Example 1, except that a vehicle described below was used unlike in Example 1.

With the obtained ink, a settling property, re-dispersibility, and whiteness of a printed image were evaluated in the same manner as in Example 1. The results are shown in Table 2.

—Preparation of Vehicle—
A vehicle was obtained by mixing the raw materials described below.
ACRIT WEM-321U (acrylic urethane resin particles, manufactured by Taisei Kako Co., Ltd., with a solid content concentration of 38% by mass)—52.6 parts by mass
Glycerin—8.9 parts by mass
1,3-butanediol—23 parts by mass
2-ethyl-1,3-hexanediol—6.3 parts by mass
POLYFOX PF-156A (anionic fluorosurfactant, manufactured by Omnova Solutions Inc.)—5.2 parts by mass
PROXEL LV (antiseptic/mildewcide, 1,2-benzisothiazolin-3-one, manufactured by Nitto Denko Avecia Inc.)—0.3 parts by mass
Triethanol amine—0.2 parts by mass
Ion-exchanged water—3.5 parts by mass

Example 13

An ink was prepared in the same manner as in Example 1, except that a vehicle described below was used unlike in Example 1.

With the obtained ink, a settling property, re-dispersibility, and whiteness of a printed image were evaluated in the same manner as in Example 1. The results are shown in Table 2.

—Preparation of Vehicle—

A vehicle was obtained by mixing the raw materials described below.

ACRIT WEM-321U (acrylic urethane resin particles, manufactured by Taisei Kako Co., Ltd., with a solid content concentration of 38% by mass)—0.3 parts by mass Glycerin—11.7 parts by mass 1,3-butanediol—35.2 parts by mass 2-ethyl-1,3-hexanediol—6.3 parts by mass POLYFOX PF-156A (anionic fluorosurfactant, manufactured by Omnova Solutions Inc.)—5.2 parts by mass PROXEL LV (antiseptic/mildewcide, 1,2-benzisothiazolin-3-one, manufactured by Nitto Denko Avecia Inc.)—0.3 parts by mass Triethanol amine—0.2 parts by mass Ion-exchanged water—40.8 parts by mass

Example 14

An ink was prepared in the same manner as in Example 1, except that a vehicle described below was used unlike in Example 1.

With the obtained ink, a settling property, re-dispersibility, and whiteness of a printed image were evaluated in the same manner as in Example 1. The results are shown in Table 2.

—Preparation of Vehicle—

A vehicle was obtained by mixing the raw materials described below.

ACRIT WEM-321U (acrylic urethane resin particles, manufactured by Taisei Kako Co., Ltd., with a solid content concentration of 38% by mass)—26.3 parts by mass Glycerin—11.7 parts by mass 1,3-butanediol—35.2 parts by mass 2-ethyl-1,3-hexanediol—6.3 parts by mass POLYFOX PF-156A (anionic fluorosurfactant, manufactured by Omnova Solutions Inc.)—5.2 parts by mass PROXEL LV (antiseptic/mildewcide, 1,2-benzisothiazolin-3-one, manufactured by Nitto Denko Avecia Inc.)—0.3 parts by mass Triethanol amine—0.2 parts by mass Ion-exchanged water—14.8 parts by mass

Example 15

An ink was prepared in the same manner as in Example 1, except that a vehicle described below was used unlike in Example 1.

With the obtained ink, a settling property, re-dispersibility, and whiteness of a printed image were evaluated in the same manner as in Example 1. The results are shown in Table 2.

—Preparation of Vehicle—

A vehicle was obtained by mixing the raw materials described below.

ACRIT WBR-2018 (polyurethane resin particles, manufactured by Taisei Fine Chemical Co., Ltd., with a solid content concentration of 32.5% by mass)—15 parts by mass Glycerin—11.7 parts by mass 1,3-butanediol—35.2 parts by mass 2-ethyl-1,3-hexanediol—6.3 parts by mass POLYFOX PF-156A (anionic fluorosurfactant, manufactured by Omnova Solutions Inc.)—5.2 parts by mass PROXEL LV (antiseptic/mildewcide, 1,2-benzisothiazolin-3-one, manufactured by Nitto Denko Avecia Inc.)—0.3 parts by mass Triethanol amine—0.2 parts by mass Ion-exchanged water—26.1 parts by mass

Example 16

An ink was prepared in the same manner as in Example 1, except that a vehicle described below was used unlike in Example 1.

With the obtained ink, a settling property, re-dispersibility, and whiteness of a printed image were evaluated in the same manner as in Example 1. The results are shown in Table 2.

CHALINE R-170EM (acrylic silicone resin particles, manufactured by Nissin Chemical Industry Co., Ltd., with a solid content concentration of 45% by mass)—18.5 parts by mass Glycerin—11.7 parts by mass 1,3-butanediol—35.2 parts by mass 2-ethyl-1,3-hexanediol—6.3 parts by mass POLYFOX PF-156A (anionic fluorosurfactant, manufactured by Omnova Solutions Inc.)—5.2 parts by mass PROXEL LV (antiseptic/mildewcide, 1,2-benzisothiazolin-3-one, manufactured by Nitto Denko Avecia Inc.)—0.3 parts by mass Triethanol amine—0.2 parts by mass Ion-exchanged water—22.6 parts by mass

Comparative Example 4

An ink was prepared in the same manner as in Example 1, except that a vehicle described below was used unlike in Example 1.

With the obtained ink, a settling property, re-dispersibility, and whiteness of a printed image were evaluated in the same manner as in Example 1. The results are shown in Table 2.

—Preparation of Vehicle—

A vehicle was obtained by mixing the raw materials described below.

Glycerin—11.7 parts by mass 1,3-butanediol—35.2 parts by mass 2-ethyl-1,3-hexanediol—6.3 parts by mass POLYFOX PF-156A (anionic fluorosurfactant, manufactured by Omnova Solutions Inc.)—5.2 parts by mass PROXEL LV (antiseptic/mildewcide, 1,2-benzisothiazolin-3-one, manufactured by Nitto Denko Avecia Inc.)—0.3 parts by mass Triethanol amine—0.2 parts by mass Ion-exchanged water—41.1 parts by mass

Comparative Example 5

A titanium oxide dispersion liquid described in Example 1 of JP-A No. 2011-225867 (a product obtained by treating with a silane coupling agent, a surface-treated titanium oxide co-present with alumina and silica at an alumina:silica mass ratio of 2:3) was prepared. A particle diameter (D50) of this pigment dispersion liquid at a 50% cumulative mean in a volume-basis particle size distribution thereof was measured with a granularity distribution analyzer (MICROTRACK UPA-EX150 manufactured by Nikkiso Co., Ltd.), and it was 287 nm.

An ink of Comparative Example 5 was prepared by adding glycerin (10 parts by mass), and as a surfactant, POLYFOX PF-156A (anionic fluorosurfactant, manufactured by Omnova Solutions Inc.) (1.5 parts by mass) in the obtained pigment dispersion liquid (88.5 parts by mass), and stirring them.

With the obtained ink, a settling property, re-dispersibility, and whiteness of a printed image were evaluated in the same manner as in Example 1. The results are shown in Table 2.

Comparative Example 6

An ink of Comparative Example 6 was prepared by adding glycerin (3 parts by mass), JONCRYL 60J (water-soluble acrylic polymer, with a weight average molecular weight of 8,500, a 34% by mass aqueous solution, manufactured by BASF Japan Ltd.) (7 parts by mass), and as a surfactant, POLYFOX PF-156A (anionic fluorosurfactant, manufactured by Omnova Solutions Inc.) (1.5 parts by mass) in the titanium oxide dispersion liquid prepared in Comparative Example 5 (88.5 parts by mass), and stirring them.

With the obtained ink, a settling property, re-dispersibility, and whiteness of a printed image were evaluated in the same manner as in Example 1. The results are shown in Table 2.

TABLE 1

| | Pigment dispersion liquid | | | |
|---|---|---|---|---|
| | Inorganic pigment | | Water-soluble organic solvent | |
| | Kind | Content (part by mass) | 3-methyl-1,3-butanediol (part by mass) | 3-methoxy-3-methyl-1-butanol (part by mass) |
| Ex. 1 | $TiO_2$ surface-treated with silicone of Preparation Example 1 | 6 | 12 | — |
| Ex. 2 | $TiO_2$ surface-treated with silicone of Preparation Example 1 | 6 | — | 18 |
| Ex. 3 | $TiO_2$ surface-treated with hydrophobic silicone (CR-63) | 6 | 18 | — |
| Ex. 4 | $TiO_2$ surface-treated with hydrophobic silicone (CR-63) | 6 | — | 10 |
| Ex. 5 | $TiO_2$ surface-treated with alkyl of Preparation Example 2 | 6 | 12 | — |
| Ex. 6 | $TiO_2$ surface-treated with alkyl of Preparation Example 2 | 6 | — | 18 |
| Ex. 7 | $TiO_2$ surface-treated with hydrophobic silicone (MTY-02) | 6 | — | 18 |
| Ex. 8 | $TiO_2$ surface-treated with silicone of Preparation Example 1 | 6 | 3.5 | — |
| Ex. 9 | $TiO_2$ surface-treated with silicone of Preparation Example 1 | 6 | — | 2 |
| Ex. 10 | $TiO_2$ surface-treated with silicone of Preparation Example 1 | 6 | 19.5 | — |
| Ex. 11 | $TiO_2$ surface-treated with silicone of Preparation Example 3 | 6 | — | 12 |
| Comp. Ex. 1 | Hydrophilized $TiO_2$ (CR-60) | 6 | 12 | — |
| Comp. Ex. 2 | Hydrophilized $TiO_2$ (CR-50) | 6 | — | 18 |
| Comp. Ex. 3 | Non-treated $SiO_2$ (by Sakai Chemical Industry Co., Ltd.) | 6 | — | 12 |
| Comp. Ex. 4 | $TiO_2$ surface-treated with silicone of Preparation Example 1 | 6 | 12 | — |

| | Pigment dispersion liquid | | | |
|---|---|---|---|---|
| | Dispersant DISPERBYK-190 (parts by mass) | Ion-exchanged water (part by mass) | Total (part by mass) | Median diameter (D50) (nm) of dispersion liquid |
| Ex. 1 | 0.6 | 11.4 | 30 | 331 |
| Ex. 2 | 0.6 | 5.4 | 30 | 263 |
| Ex. 3 | 0.6 | 5.4 | 30 | 352 |
| Ex. 4 | 0.6 | 13.4 | 30 | 320 |
| Ex. 5 | 0.6 | 11.4 | 30 | 297 |
| Ex. 6 | 0.6 | 5.4 | 30 | 278 |
| Ex. 7 | 0.6 | 5.4 | 30 | 195 |
| Ex. 8 | 0.6 | 19.9 | 30 | 657 |
| Ex. 9 | 0.6 | 21.4 | 30 | 483 |
| Ex. 10 | 0.6 | 4.9 | 30 | 246 |
| Ex. 11 | 0.6 | 11.4 | 30 | 516 |

TABLE 1-continued

| | | | | |
|---|---|---|---|---|
| Comp. Ex. 1 | 0.6 | 11.4 | 30 | 368 |
| Comp. Ex. 2 | 0.6 | 5.4 | 30 | 349 |
| Comp. Ex. 3 | 0.6 | 11.4 | 30 | 475 |
| Comp. Ex. 4 | 0.6 | 11.4 | 30 | 331 |

TiO$_2$ surface-treated with a hydrophobic silicone (CR-63 manufactured by Ishihara Sangyo Kaisha, Ltd.)
TiO$_2$ surface-treated with a hydrophobic silicone (MTY-02 manufactured by Tayca Corporation)
Hydrophilized TiO$_2$ (CR-60 manufactured by Ishihara Sangyo Kaisha, Ltd.)
Hydrophilized TiO$_2$ (CR-50 manufactured by Ishihara Sangyo Kaisha, Ltd.)
Non-treated SiO$_2$ (spherical silica having a particle diameter of 0.4 μm, manufactured by Ishihara Sangyo Kaisha, Ltd.)

TABLE 2

| | Ink properties | | | | | |
|---|---|---|---|---|---|---|
| | Resin particle content (solid content) in ink (% by mass) | Median diameter (D50) (nm) of inorganic pigment | Viscosity (mPa · s) | Settling property | Re-dispersibility | Whiteness of printed image |
| Ex. 1 | 2.4 | 316 | 11.4 | A | A | A |
| Ex. 2 | 2.4 | 251 | 10.3 | A | A | A |
| Ex. 3 | 2.4 | 340 | 16.8 | A | A | A |
| Ex. 4 | 2.4 | 298 | 3.94 | A | A | A |
| Ex. 5 | 2.4 | 285 | 15.6 | A | A | A |
| Ex. 6 | 2.4 | 259 | 11.2 | A | A | A |
| Ex. 7 | 2.4 | 185 | 10.8 | A | A | B |
| Ex. 8 | 2.4 | 631 | 2.93 | B | B | A |
| Ex. 9 | 2.4 | 452 | 1.85 | B | B | A |
| Ex. 10 | 2.4 | 261 | 21.2 | A | B | B |
| Ex. 11 | 2.4 | 483 | 9.84 | A | A | B |
| Ex. 12 | 10 | 309 | 18.3 | A | A | A |
| Ex. 13 | 0.05 | 297 | 5.45 | B | B | A |
| Ex. 14 | 5 | 333 | 13.6 | A | A | A |
| Ex. 15 | 2.5 | 321 | 12.2 | A | A | A |
| Ex. 16 | 4.2 | 312 | 14.8 | A | A | A |
| Comp. Ex. 1 | 2.4 | 360 | 10.5 | C | C | A |
| Comp. Ex. 2 | 2.4 | 371 | 8.98 | C | C | A |
| Comp. Ex. 3 | 2.4 | 460 | 10.3 | C | C | C |
| Comp. Ex. 4 | Absent | 322 | 8.81 | C | C | B |
| Comp. Ex. 5 | Absent | 308 | 9.64 | C | B | A |
| Comp. Ex. 6 | Absent | 295 | 10.1 | C | B | A |

From the results of Table 2, it was revealed that all of Examples 1 to 16 that included an inorganic pigment having a surface hydrophobicity and resin particles had all of an excellent settling property, an excellent re-dispersibility, and an excellent whiteness of a printed image.

It was revealed that Comparative Example 6 was poor in the settling property and re-dispersibility, because it used a water-soluble acrylic polymer.

Aspects of the present invention are as follows, for example.

<1> An ink, including at least:
   an inorganic pigment having a surface hydrophobicity;
   resin particles; and
   water.

<2> The ink according to <1>,
   wherein the inorganic pigment having a surface hydrophobicity is titanium dioxide.

<3> The ink according to <1> or <2>,
   wherein the inorganic pigment having a surface hydrophobicity obtained by applying a silicone surface treatment or an alkyl surface treatment to an inorganic pigment.

<4> The ink according to any one of <1> to <3>,
   wherein a particle diameter (D50) of the inorganic pigment having a surface hydrophobicity at a 50% cumulative mean in a volume-basis particle size distribution thereof is from 200 nm to 600 nm.

<5> The ink according to any one of <1> to <4>,
   wherein the resin particles are at least one kind selected from the group consisting of styrene acrylic resin particles, acrylic silicone resin particles, polyurethane resin particles, and acrylic urethane resin particles.

<6> The ink according to any one of <1> to <5>,
   wherein a content of the resin particles is from 0.1% by mass to 20% by mass.

<7> The ink according to any one of <1> to <6>,
   wherein the ink is a white ink.

<8> The ink according to any one of <1> to <7>,
   wherein the ink is for inkjet recording.

<9> An ink cartridge, including:
   the ink according to any one of <1> to <8>; and
   a container containing the ink.

<10> An inkjet recording apparatus, including at least:
   an ink flying unit configured to apply an impulsion to the ink according to any one of <1> to <8> to fly the ink, to thereby record an image on a recording medium.

<11> An inkjet recording method, including at least:
applying an impulsion to the ink according to any one of <1> to <8> to fly the ink, to thereby record an image on a recording medium.
<12> An image forming method, including:
forming an image over a base material using the ink according to any one of <1> to <7>.
<13> An ink recorded matter, including:
an image formed over a base material using the ink according to any one of <1> to <8>.

This application claims priority to Japanese application No. 2013-268914, filed on Dec. 26, 2013 and incorporated herein by reference.

What is claimed is:

1. An inkjet recording method for recording an image by using ink, on a nonporous substrate, the inkjet recording method comprising:
   (a) applying a white ink comprising an inorganic white pigment being surface modified to have a surface hydrophobicity, resin particles, and water, to the non-porous substrate, to form a white layer formed on the non-porous substrate, the non-porous substrate having been selected from the group consisting of a polyvinyl chloride film, a polyethylene terephthalate (PET) film, a polycarbonate film, a polyethylene film, an acrylic film, a polypropylene film, a polyimide film, and a polystyrene film; and
   (b) forming an image over the white layer, by applying an ink of another color onto the white layer.

2. The inkjet recording method according to claim 1, further comprising:
   (c) heating the image at from 50° C. to 200° C. at the same time as or before forming the image.

3. The inkjet recording method according to claim 1, wherein the inorganic white pigment is obtained by surface treating the inorganic white pigment with hydrophobic silicone.

4. The inkjet recording method according to claim 1, wherein the inorganic white pigment is obtained by surface treating the inorganic white pigment with an alkyl.

5. The inkjet recording method according to claim 1, wherein the resin particles include at least one selected from the group consisting of styrene acrylic resin particles, acrylic silicone resin particles, polyurethane resin particles, and acrylic urethane resin particles.

6. The inkjet recording method according to claim 1, wherein the resin particles include anionic self-emulsifying polyurethane resin particles.

7. The inkjet recording method according to claim 1, wherein the resin particles include ether type polyurethane-based resin particles.

8. An inkjet recording method for recording an image by using ink, on a nonporous substrate, the method comprising:
   forming a white layer by applying to the non-porous substrate a white ink comprising resin particles, water and an inorganic white pigment having a surface hydrophobicity obtained by treating the inorganic white pigment with a surface treatment using silicone or an alkyl; and
   forming an image over the white layer, by applying an ink of another color onto the white layer.

9. The inkjet recording method according to claim 8, further comprising:
   heating the image at from 50° C. to 200° C. at the same time as or before forming the image.

10. The inkjet recording method according to claim 8, wherein the resin particles include at least one selected from the group consisting of styrene acrylic resin particles, acrylic silicone resin particles, polyurethane resin particles, and acrylic urethane resin particles.

11. The inkjet recording method according to claim 8, wherein the resin particles include anionic self-emulsifying polyurethane resin particles.

12. The inkjet recording method according to claim 8, wherein the resin particles include ether type polyurethane-based resin particles.

13. The inkjet recording method according to claim 8, wherein the nonporous substrate is selected from the group consisting of a polyvinyl chloride film, a polyethylene terephthalate (PET) film, a polycarbonate film, a polyethylene film, a acrylic film, a polypropylene film, a polyimide film, and a polystyrene film.

* * * * *